3,819,767
PROCESS FOR PRODUCING BLOCK COPOLYMER
Takatoshi Shimomura, Toyonaka, Hideo Nagata and Yoshiaki Murakami, Ibaragi, and Haruyoshi Sanno and Tadanori Inoue, Takatsuki, Japan, assignors to Sumitomo Chemical Company, Limited, Osaka, Japan
No Drawing. Filed Aug. 28, 1972, Ser. No. 283,954
Claims priority, application Japan, Aug. 31, 1971, 46/67,308
Int. Cl. C08f 19/06, 19/08
U.S. Cl. 260—880 B
15 Claims

ABSTRACT OF THE DISCLOSURE

A self-curing block copolymer, which has improved elastomeric properties without being subjected to any special chemical or physical treatment, is obtained by anionically polymerizing a vinyl-substituted aromatic hydrocarbon in the presence of an organo monolithium compound as catalyst, and after substantial commencement of polymerization of the vinyl-substituted aromatic hydrocarbon, copolymerizing a conjugated diene in the presence of the vinyl-substituted aromatic hydrocarbon, and after substantial completion of polymerization of the conjugated diene, adding a chelating bi- or tri-functional Lewis base to continue the polymerization of the vinyl-substituted aromatic hydrocarbon. The block copolymer thus obtained has a high tensile strength and high elongation in the unvulcanized state and can be processed similarly to a thermoplastic resin by injection and extrusion techniques.

---

This invention relates to a novel process for producing a three-block copolymer having the so-called self-curing property, which exhibits useful elastomeric properties without requiring any special chemical or physical treatment.

More particularly, this invention relates to a process for producing a block copolymer containing in the molecule thereof a middle copolymer block composed of predominant units of a conjugated diene and remaining units of a vinyl-substituted aromatic hydrocarbon represented by the general formula,

(wherein Ar is an aryl group and R is hydrogen or an alkyl group of 1 to 10 carbon atoms), and homopolymer end-blocks composed of units of said vinyl-substituted aromatic hydrocarbon, by anionically copolymerizing said vinyl-substituted aromatic hydrocarbon by use of an organo monolithium compound as catalyst, and after substantial commencement of polymerization of the vinyl-substituted aromatic hydrocarbon, adding a conjugated diene to continue polymerization of the conjugated diene, which comprises when polymerization is again commenced in the vinyl-substituted aromatic hydrocarbon, adding Lewis base, particularly a chelating bi- or tri-functional Lewis base to continue the polymerization of vinyl-substituted aromatic hydrocarbon.

While various block copolymers have heretofore been prepared from a variety of monomers using an organoalkali metal compound as an initiator, it has been known that in producing a block copolymer with a self-curing property, the polymer molecule must be constructed in such an arrangement that a conjugated diene block is in the middle and blocks of a specific non-elastomeric unsaturated compound at both ends. It has also been known that when alkali metals other than lithium are used as catalyst or when compounds other than hydrocarbons are used as solvent, the content of cis-1,4 linkages in the diene block becomes considerably low so that a block copolymer of useful elastomeric properties can hardly be obtained.

Consequently, there has been adopted a process in which, by use of an organo monolithium compound as an initiator and a technique of living polymerization, a stepwise polymerization is carried out in such a manner that successively a non-elastomeric block consisting of vinyl-substituted aromatic hydrocarbon units, an elastomeric block consisting mainly of conjugated diene units, and again the same non-elastomeric block as the first named are formed. Alternatively, there has been adopted a process in which polymerizations of a vinyl-substituted aromatic hydrocarbon and of a conjugated diene are carried out stepwise in uninterrupted succession to prepare a living polymer [non-elastomeric block-elastomeric block]$^-$Li$^+$, and then two or more of the living polymers are linked with each other by use of a suitable linking agent, resulting in an abrupt increase in molecular weight and simultaneous formation of a three-block copolymer. However, such conventional processes have failed in polymerizing α-substituted styrenes, which have low ceiling temperatures, and hence in synthesizing a block copolymer having blocks of an α-substituted styrene at both ends, which is expected to be an elastomer of the self-curing type superior in physical properties to an ordinary block copolymer.

As a result of detailed investigation on the mechanism of initiation and chain growth in the polymerization of a conjugated vinyl monomer capable of forming a stable carbanion, the present inventors found that a complex formed from an organolithium compound and a certain chelating bi- or tri-functional Lewis base greatly increases the rate of both initation and chain growth in anionic polymerization of a conjugated vinyl compound. Based on this finding and an equilibrium polymerizability of an α-substituted styrene derivative such as α-methylstyrene which has been known, the present inventors have developed a process for producing a block copolymer having in each molecule a middle copolymer block composed of predominant units of a conjugated diene and remaining units of a vinyl-substituted aromatic hydrocarbon and homopolymer end blocks composed of vinyl-substituted aromatic hydrocarbon units, which comprises anionically polymerizing a vinyl-substituted aromatic hydrocarbon by use of an organo monolithium compound as catalyst, and before the completion of the polymerization, preferably at the stage when substantially 40 to 60% of the vinyl-substituted aromatic hydrocarbon was consumed and the polymerization system was attained to equilibrium, adding a conjugated diene to mainly continue the polymerization of the conjugated diene, and then adding a chelating bi- or tri-functional Lewis base to effect polymerization of remaining vinyl-substituted aromatic hydrocarbon.

An object of this invention is to provide a process for producing a block copolymer of the self-curing type having improved elastomeric properties without requiring any special chemical and physical treatments.

Another object of this invention is to provide a block copolymer which has a high tensile strength and a high elongation in unvulcanized state and is capable of being processed by injection molding and extrusion in the same way as a thermoplastic resin.

In the process for living polymerization according to this invention, in order to secure rubber-like microstructure of the middle block composed mainly of conjugated diene units in the block copolymer molecule, a chelating bi- or tri-functional Lewis base is added preferably after substantial completion of the polymerization of a conjugated diene.

In the process of this invention, after addition of a chelating bi- or tri-functional Lewis base, the lithium cations existing as counter-ions at both active ends of a polymerizating molecule are always captured by the chelating bi- or tri-functional Lewis base. Accordingly, the active species takes part in the polymerization reaction in the form of a substantially free carbanion and hence most of the vinyl-substituted aromatic hydrocarbons rapidly polymerize in a hydrocarbon even at an extremely low temperature. For instance, a relatively high temperature and a long period of time are required for polymerization of styrene in a hydrocarbon with an organolithium catalyst, whereas in the process of this invention the polymerization is completed within several minutes at a low temperature below 0° C. Conventional processes failed in synthesizing a block copolymer having at both ends blocks of a styrene derivative containing a methyl group in the α-position, because owing to a lower ceiling temperature as well as an electron-donating tendency due to the α-methyl group, said styrene derivative will not yield a polymer with an organolithium catalyst in a hydrocarbon at a temperature within an ordinary range of —78° to 100° C. whereas according to this invention, in the presence of a chelating bi- or tri-functional Lewis base, polymerization of said styrene derivative proceeds at a sufficiently high rate even at a temperature as low as —78° C. and the synthesis of a block copolymer having both end blocks of a styrene derivative containing a methyl group at the α-position has been successfully carried out for the first time. Further, it is a desirable fact that compared with self-curing elastomers prepared by conventional processes thermal properties of the block copolymer according to this invention are considerably improved when both end blocks are composed of units of a styrene derivative having a methyl group at the α-position.

In the following, the invention will be more concretely disclosed.

The lithium compounds for use in the present invention as catalysts are saturated aliphatic monolithium compounds such as methyllithium, ethyllithium, n-propyllithium, iso-propyllithium, n-butyllithium, sec-butyllithium, tert-butyllithium, n-amyllithium, sec-amyllithium, tert-amyllithium, n-hexyllithium, 2-ethylhexyllithium, n-hexadecyllithium and cyclohexyllithium; unsaturated aliphatic monolithium compounds such as allyllithium, methallyllithium; and aryllithium, alkaryllithium and aralkyllithium such as phenyllithium, various tolyllithium and xylyllithium, and α-naphthyllithium.

The vinyl-substituted aromatic hydrocarbon to be used advantageously in the process of this invention are hydrocarbon monomers represented by the formula, $$CH_2=\overset{R}{\underset{Ar}{C}}$$

(wherein Ar is an aryl group and R is hydrogen or an alkyl group of 1 to 10 carbon atoms), and concretely there include styrene, 3-vinyltoluene, α-methylstyrene, α,p-dimethylstyrene, 1-vinylnaphthalene, and the like, and include others without exceptions so far as they are polymerizable by use of an organo monolithium compound and have reactivity ratios different from those of conjugated dienes so that they may be susceptible to block polymerization. It is to be particularly noted that the process of this invention is also applicable to compound having a substituent at the alpha carbon atom, such as α-methylstyrene, because α-methylstyrene does not form a high molecular weight polymer under ordinary conditions due to its low ceiling temperature, whereby it is high in the equilibrium monomer concentration and is relatively controllable to maintain the polymerization system in equilibrium state at the polymerization rate of 40 to 60%. The conjugated dienes for use in producing the block copolymer according to this invention are 1,3-butadiene, isoprene, 1,3-pentadiene, and the like.

In the process of this invention, the chelating bi-functional Lewis base to be added after completion of the polymerization of a conjugated diene is an organic tertiary amine represented by the formula (I):

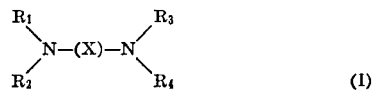  (I)

and the chelating tri-functional Lewis base to be similarly added is an aminophosphine oxide represented by the formula (II):

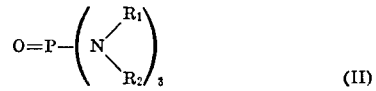  (II)

In the formula (I), the substituent groups $R_1$, $R_2$, $R_3$ and $R_4$ are alkyl groups of 1 to 4 carbon atoms and X is an alkylene group of 1 to 4 carbon atoms or a cycloalkylene group of 4 to 7 carbon atoms, both of which having as substituents 0 to 4 monovalent hydrocarbon groups of 1 to 20 carbon atoms. Of these groups represented by X, an alkylene group of 2 or 3 carbon atoms and a cycloalkylene group of 5 or 6 carbon atoms are far more desirable than other groups. Examples of suitable tertiary amine compounds are N,N,N',N'-tetramethylmethanediamine,
N,N-dimethyl-N',N'-diethyl-1,2-ethanediamine,
N,N,N',N'-tetramethyl-1,2-ethanediamine,
N,N,N',N'-tetramethyl-2,3-butanediamine,
N,N,N',N'-tetramethyl-1,2-propanediamine, and
N,N,N',N'-tetramethyl-1,2-cyclohexanediamine.

Of these, the most preferred is N,N,N',N'-tetramethyl-1,2-ethanediamine.

In the formula (II), the substituent groups $R_1$ and $R_2$ are alkyl groups of 1 to 4 carbon atoms. Examples of such compounds include tris(dimthylamino)phosphine oxide, tris(diethylamino)phosphine oxide, and the like, of which tris(dimethylamino)phosphine oxide is particularly preferred.

The complex-forming reaction of such a chelating Lewis base with a polymer at the chain end where a lithium cation is attached as a counter-ion takes place momentarily, resulting in a free carbanion which enters the polymerization reaction as an active species. Therefore, many vinyl-substituted aromatic hydrocarbons rapidly polymerize in a hydrocarbon even at extremely low temperature. In the past, it has been observed that various ethers or amines accelerate polymerization of vinyl compounds catalyzed by an organolithium compound. These were used, however, in large excess against active end groups in the polymerization of vinyl compounds because there was no chelate formation, whereas in the process of this invention, it is sufficient to use the chelating bi- or tri-functional Lewis base in a ratio as small as 1:1 against the active end groups though the use of an excess amount of the chelating Lewis base will cause no trouble at all.

The polymerization can be effected either in bulk by adding an organo monolithium compound into a vinyl-substituted aromatic hydrocarbon, or in solution by adding an organo monolithium compound into a solution containing a mixture of monomers dissolved therein.

In carrying out the polymerization of conjugated diene in the presence of vinyl-substituted aromatic hydrocarbon by adding the conjugated diene as it is or a solution of the conjugated diene dissolved in some suitable diluent, the time at which conjugated diene is added is one of the factors of the polymerization. It is preferable to add the conjugated diene at the time when the vinyl-substituted aromatic hydrocarbon is polymerized in the polymerization rate of 40 to 60%, preferably 50% and equilibrates with living polymer thereof. The reason for above is that the tensile strength of the block copolymer is large in case where the length of end blocks comprising vinyl-substituted aromatic hydrocarbon polymers are symmetric than another case. However, in case of vinyl-substituted aromatic hydrocarbon, which is relatively high in the polymerization rate, so that set of the condition for equilibrium state is difficult, it is preferable to add the conjugated diene at the time when the polymerization rate comes up to about 50% as far as it is possible. In any case, an active terminal transfers from a vinyl-substituted aromatic hydrocarbon to a conjugated diene at the same time when the conjugated diene is added, and polymerization of the conjugated diene mainly proceeds in the presence of remaining vinyl-substituted aromatic hydrocarbon, but after the conjugated diene was substantially consumed, the active point of polymerization again transfers from the conjugated diene to the vinyl-substituted aromatic hydrocarbon. After the polymerization of a diene has been substantially completed, the chelating Lewis base is added to the polymerization system in an aquimolar ratio against the active end groups. Alternatively, the chelating Lewis base can be added during the course of polymerization of the diene or during the course of polymerization of the vinyl-substituted aromatic hydrocarbon which is the first step of the process without causing any trouble except for deterioration of rubber-like characteristics of the microstructure. As far the solvent for use in the present polymerization reaction, inertness of the solvent to the living polymer is absolutely necessary. Suitable solvents are, for example, aromatic hydrocarbons such as benzene and toluene, and aliphatic hydrocarbons such as n-hexane, n-heptane, and cyclohexane, which are used each alone or in mixtures of two or more of them. These solvents and the starting materials are required to be freed from impurities, which could react with carbanions, prior to use in the polymerization, although the presence of some quantities of the impurities is not fatal to the polymerization except for some consumption of the polymerization initiators.

The polymerization temperature is 0° to 60° C., preferably about room temperature, for the first step while polymerization of a vinyl-substituted aromatic hydrocarbon is in progress, and for the second step while polymerization of a conjugated diene is in progress, the polymerization temperature is generally —20° to 100° C., preferably 0° to 65° C., and thereafter can be freely selected from the range from —78° C. up to the boiling point of the solvent for the last step, subsequent to the addition of a chelating Lewis base, while block-copolymerization of a vinyl-substituted aromatic hydrocarbon with the copolymer formed in the second step is in progress. The chain length and molecular weight distribution of the block copolymer thus formed are easily regulated so as to meet requirements for the end product by suitably selecting polymerization conditions such as the ratio of monomers to an organo monolithium compound or the polymerization temperature. While there is no particular quantitative limitation between the conjugated diene, which forms the middle block, and the vinyl-substituted aromatic hydrocarbon, which forms both end blocks, it is desirable to use a block copolymer containing predominantly the former monomer as a self-curing elastomer and a block copolymer containing predominantly the latter monomer as an impact resistant plastic. The block copolymer produced according to this invention contains preferably 5 to 50% by weight of a vinyl-substituted aromatic hydrocarbon component (plastic component).

As mentioned in the forgoing, this invention provides a novel process for producing a self-curing block copolymer having an improved elastomeric characteristic without requiring any special chemical or physical treatment, which comprises polymerizing a vinyl-substituted aromatic hydrocarbon in the presence of an organo monolithium compound as catalyst and preferably after consumption of 40 to 60% of vinyl-substituted aromatic hydrocarbon, adding a conjugated diene to continue the polymerization of the conjugated diene, and when the polymerization reaction transfers from the conjugated diene to the vinyl-substituted aromatic hydrocarbon, adding a chelating bi- or tri-functional Lewis base to further continue the polymerization of the vinyl-substituted aromatic hydrocarbon. Particularly, this invention provides a process which is well suited for block copolymerization of an α-substituted styrene derivative such as α-methylstyrene. The block copolymer obtained according to this invention has a high tensile strength and a high elongation in the unvulcanized state and has an injection moldability and an extrusion moldability comparable to those of a thermoplastic resin.

The invention is illustrated below in detail with reference to Examples, but is not limited thereto. Measurement of the physical properties was carried out in accordance with JIS K 6301.

EXAMPLE 1

To 6.7 ml. of α-methylstyrene, which had been purified and dehydrated with calcium hydride, was added 0.25 millimole of n-butyllithium, and bulk polymerization is carried out under a reduced pressure at a room temperature for 2 hours. When polymerization rate of α-methylstyrene comes up to 50%, 300 ml. of toluene containing 30 ml. of isoprene which had been purified and dehydrated in an ordinary way, was introduced from a glass ampoule into the reaction system to continue the polymerization of isoprene. When isoprene was added, the color of the reaction system turned from red to yellow, and after continuing a stirring of the reaction system for 24 hours at a room temperature, the color again turned to red, which indicates that the polymerization reaction transferred from isoprene to α-methylstyrene. The reaction system was cooled to —78° C. and 0.5 millimole of tris(dimethylamino)phosphine oxide was added thereto and then polymerization of α-methylstyrene was further continued for 24 hours. After the completion of the reaction, the reaction mixture colored in dark red was poured into a large volume of methanol to recover a block copolymer which weighed 28.1 g. and had an intrinsic viscosity [$\eta$] of 1.21 dl./g. as measured in benzene at 25° C.

Physical properties of the block copolymer thus obtained are as follows:

| | |
|---|---|
| Tensile strength, kg./cm.$^2$ | 240 |
| Elongation, percent | 1500 |
| 300% modulus, kg./cm.$^2$ | 20 |
| Hardness | 66 |

EXAMPLE 2

To 7.3 ml. of α,p-dimethylstyrene which had been dehydrated with calcium hydride, was added 0.5 millimole of n-butyllithium under a reduced pressure and then bulk-polymerization of α,p-dimethylstyrene was carried out up to the polymerization rate comes up to 50% at a room temperature for 5 hours. To the reaction system, was introduced from a glass ampoule 300 ml. of toluene containing 30 ml. of isoprene which had been purified and dehydrated in an ordinary way, and polymerization of isoprene was continued for 42 hours at a room temperature. After completion of the polymerization of isoprene, the color of the system turned from yellow to red which indicates the formation of living polydimethylstyrene. The system was cooled to −78° C., 0.5 millimole of tris(dimethylamino)phosphine oxide was added thereto and polymerization of dimethylstyrene was further continued at −78° C. for 24 hours. After the completion of the reaction, the reaction mixture colored in dark red was poured into a large volume of methanol to recover a block copolymer. Thus, 27.5 g. of white rubber-like polymer having an intrinsic viscosity [η] of 0.95 dl./g. as measured in benzene at 25° C. was recovered.

Physical properties of the block copolymer thus obtained are as follows:

| | |
|---|---|
| Tensile strength, kg./cm.$^2$ | 238 |
| Elongation, percent | 1480 |
| 300% modulus, kg./cm.$^2$ | 19 |
| Hardness | 64 |

EXAMPLE 3

To 500 ml. of toluene which had been dehydrated and purified in an ordinary way, was added 11 ml. of styrene which had been dehydrated with calcium hydride. After addition of 0.25 millimole of n-butyllithium to the mixture under a reduced pressure, polymerization was initiated. In 1 hour after the commencement of polymerization at a room temperature 50% of styrene added was consumed. After 22.5 ml. of isoprene which had been dehydrated with calcium hydride was introduced into the reaction system from a glass ampoule, polymerization of isoprene was effected at room temperature. After 7 hours, the color of the reaction system turned from yellow to red and isoprene was substantially consumed, so that 0.5 millimole of N,N,N′,N′-tetramethyl-1,2-ethandiamine was added to the reaction system and polymerization of the remaining styrene was completed during 5 minutes. After the completion of the reaction, the reaction mixture was poured into a large volume of methanol to recover a block copolymer which weighed 25.2 g. The block copolymer thus obtained was a white rubber-like material and had an intrinsic viscosity [η] of 1.15 dl./g. as measured in benzene at 25° C.

Physical properties of the block copolymer are as follows:

| | |
|---|---|
| Tensile strength, kg./cm.$^2$ | 216 |
| Elongation, percent | 1250 |
| 300% modulus, kg./cm.$^2$ | 9 |
| Hardness | 68 |

What is claimed is:

1. A process for producing a block copolymer having a middle copolymer block composed predominantly of units of a conjugated diene and remaining unts of a vinyl-substituted aromatic hydrocarbon of the general formula,

wherein Ar is an aryl group and R is hydrogen or an alkyl group of 1 to 10 carbon atoms and homopolymer end blocks composed of said vinyl-sustituted aromatic hydrocarbon units, by polymerizing
a vinyl-substituted aromatic hydrocarbon in the presence of an organo monolithium compound, and copolymerizing a conjugated diene in the presence of the vinyl-substituted aromatic hydrocarbon,
the conjugated diene being added to the polymerization system when the vinyl-substituted aromatic hydrocarbon is 40 to 60% polymerized, which comprises after substantial completion of polymerization of said conjugated diene, adding to the polymerization system a chelating bi-functional Lewis base represented by the general formula,

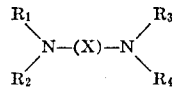

wherein $R_1$, $R_2$, $R_3$ and $R_4$ are alkyl groups of 1 to 4 carbon atoms and X is an alkylene group of 1 to 4 carbon atoms or a cycloalkylene group of 4 to 7 carbon atoms, both of which groups having as sustituents 0 to 4 monovalent hydrocarbon groups of 1 to 20 carbon atoms, or a chelating tri-functional Lewis base represented by the general formula,

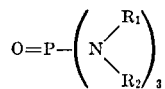

wherein $R_1$ and $R_2$ are alkyl groups of 1 to 4 carbon atoms in a ratio of at least 1:1 against the active end groups and then polymerizing the remaining vinyl-substituted aromatic hydrocarbon.

2. A process according to Claim 1, wherein the chelating bi-functional Lewis base is N,N,N′,N′-tetramethylmethanediamine,
N,N-dimethyl-N′,N′-diethyl-1,2-ethanediamine,
N,N,N′,N′-tetramethyl-1,2-ethanediamine,
N,N,N′,N′-tetramethyl-2,3-butanediamine,
N,N,N′,N′-tetramethyl-1,2-propanediamine, or
N,N,N′,N′-tetramethyl-1,2-cyclohexanediamine.

3. A process according to Claim 1, wherein the chelating bi-functional Lewis base is N,N,N′,N′-tetramethyl-1,2-ethanediamine.

4. A process according to Claim 1, wherein the chelating tri-functional Lewis base is tris(dimethylamino)phosphine oxide or tris(diethylamino)phosphine oxide.

5. A process according to Claim 1, wherein the chelating tri-functional Lewis base is tris(dimethylamino)phosphine oxide.

6. A process according to Claim 1, wherein the vinyl-substituted aromatic hydrocarbon is styrene, 3-vinyltoluene, α-methylstyrene, α,p-dimethylstyrene, 2,5-dimethyl-α-methylstyrene or 1-vinylnaphthalene.

7. A process according to Claim 1, wherein the vinyl-substituted aromatic hydrocarbon is α-methylstyrene.

8. A process according to Claim 1, wherein the conjugated diene is 1,3-butadiene, isoprene or 1,3-pentadiene.

9. A process according to Claim 1, wherein the organo monolithium compound is one member selected from the group consisting of methyllithium, ethyllithium, n-propyllithium, iso-propyllithium, n-butyllithium, sec-butyllithium, tert-butyllithium, n-amyllithium, sec-amyllithium, tert-amyllithium, n-hexyllithium, 2-ethyl-hexyllithium, n-hexadecyllithium, cyclohexyllithium, allyllithium, methallyllithium, phenyllithium, toyllithium, xylyllithium and α-naphthyllithium.

10. A process according to Claim 1, wherein the ratio of the vinyl-substituted aromatic hydrocarbon component in the block copolymer is 5 to 50% by weight.

11. A process according to Claim 1, wherein the polymerization is carried out in the solution phase using a solvent.

12. A process according to Claim 11, wherein the solvent is at least one member selected from the group consisting of benzene, toluene, n-hexane, n-heptane and cyclohexane.

13. A process according to Claim 1, wherein polymerization is carried out in bulk.

14. A process according to Claim 1, wherein the copolymerization of the conjugated diene and the vinyl-substituted aromatic hydrocarbon is carried out at a temperature of −20° to 100° C.

15. A process according to Claim 1, wherein the copolymerization of the vinyl-substituted aromatic hydrocarbon with the copolymer composed predominantly of units of a conjugated diene and remaining units of a vinyl-substituted aromatic hydrocarbon is carried out at a temperature of −78° C. up to the boiling point of the solvent used.

References Cited

UNITED STATES PATENTS

| | | | |
|---|---|---|---|
| 3,366,611 | 1/1968 | Wofford | 260—84.7 |
| 3,431,323 | 3/1969 | Jones | 260—880 B |
| 3,451,988 | 6/1969 | Langer | 260—84.7 |

FOREIGN PATENTS

| | | | |
|---|---|---|---|
| 884,974 | 12/1961 | Great Britain | 260—880 |
| 856,879 | 11/1970 | Canada | 260—880 |

JAMES A. SEIDLECK, Primary Examiner

U.S. Cl. X.R.

260—84.7, 879